United States Patent
Krenn

[19]

[11] Patent Number: 6,061,441
[45] Date of Patent: *May 9, 2000

[54] SERVICE CONTROL POINT IN AN INTELLIGENT NETWORK FOR OPTIMIZING CALL THROUGHPUT

[75] Inventor: Andreas Krenn, Vienna, Austria

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/840,025

[22] Filed: Apr. 24, 1997

[30] Foreign Application Priority Data

Apr. 24, 1996 [EP] European Pat. Off. .............. 96106449

[51] Int. Cl.[7] .............................. H04M 1/00; H04M 3/00
[52] U.S. Cl. .......................... 379/265; 379/142; 379/127
[58] Field of Search .................................... 379/265, 142, 379/115, 5, 127; 707/8; 370/352, 384

[56] References Cited

U.S. PATENT DOCUMENTS

| | | | |
|---|---|---|---|
| 5,153,909 | 10/1992 | Beckle et al. | 379/265 |
| 5,212,789 | 5/1993 | Rago | 707/8 |
| 5,440,541 | 8/1995 | Iida et al. | 370/352 |
| 5,572,579 | 11/1996 | Orriss et al. | 379/142 |
| 5,640,446 | 6/1997 | Everett et al. | 379/115 |
| 5,696,809 | 12/1997 | Voit | 379/5 |
| 5,751,707 | 5/1998 | Voit et al. | 370/384 |
| 5,757,894 | 5/1998 | Kay et al. | 379/127 |

FOREIGN PATENT DOCUMENTS 0 687 096 A2  12/1995  Germany .

OTHER PUBLICATIONS

"A Simulation Study of Hybrid SSP/IP Architecture in the Advanced Intelligent Network" (pp. 153–58); International Conference on Simulation in Engineering Education (San Diego, California); Jan. 15, 1995–Jan. 18, 1995; Authors—Jerry Stach and Jerry Place.

"Impact of New Services on SCP Performance" (pp. 223.3.1–223.3.7); International Conference on Communications (Atlanta, Georgia); Apr. 15, 1990; Author—Michael Bray.

"Distributed Control Node Architecture in the Advanced Intelligent Network" (pp. 278–282); International Switching Symposium (Berlin, Germany); Apr. 23, 1995; Authors—Masanori Hirano, Yasuo Kinouchi and Takashi Suzuki.

"SCP Architecture with Performance Flexibility" (pp. 46.7.1–46.7.5); IEEE Global Telecommunications Conference (Phoenix, Arizona); Dec. 2, 1991; Authors—Atsushi Nakamura, Toshiro Tanaka and Hisakazu Uesaka.

*Primary Examiner*—Krisna Lim
*Attorney, Agent, or Firm*—Hill & Simpson

[57] ABSTRACT

A service control point in an intelligent network having multiple computing units wherein call throughput optimization is achieved through the respective allocation of a determined processing subset of service identification numbers to each computing unit such that a computing unit RAM memory requires only those resources for which there is the possibility that, based on such allocation, they must be accessed in the course of processing a call.

6 Claims, 2 Drawing Sheets

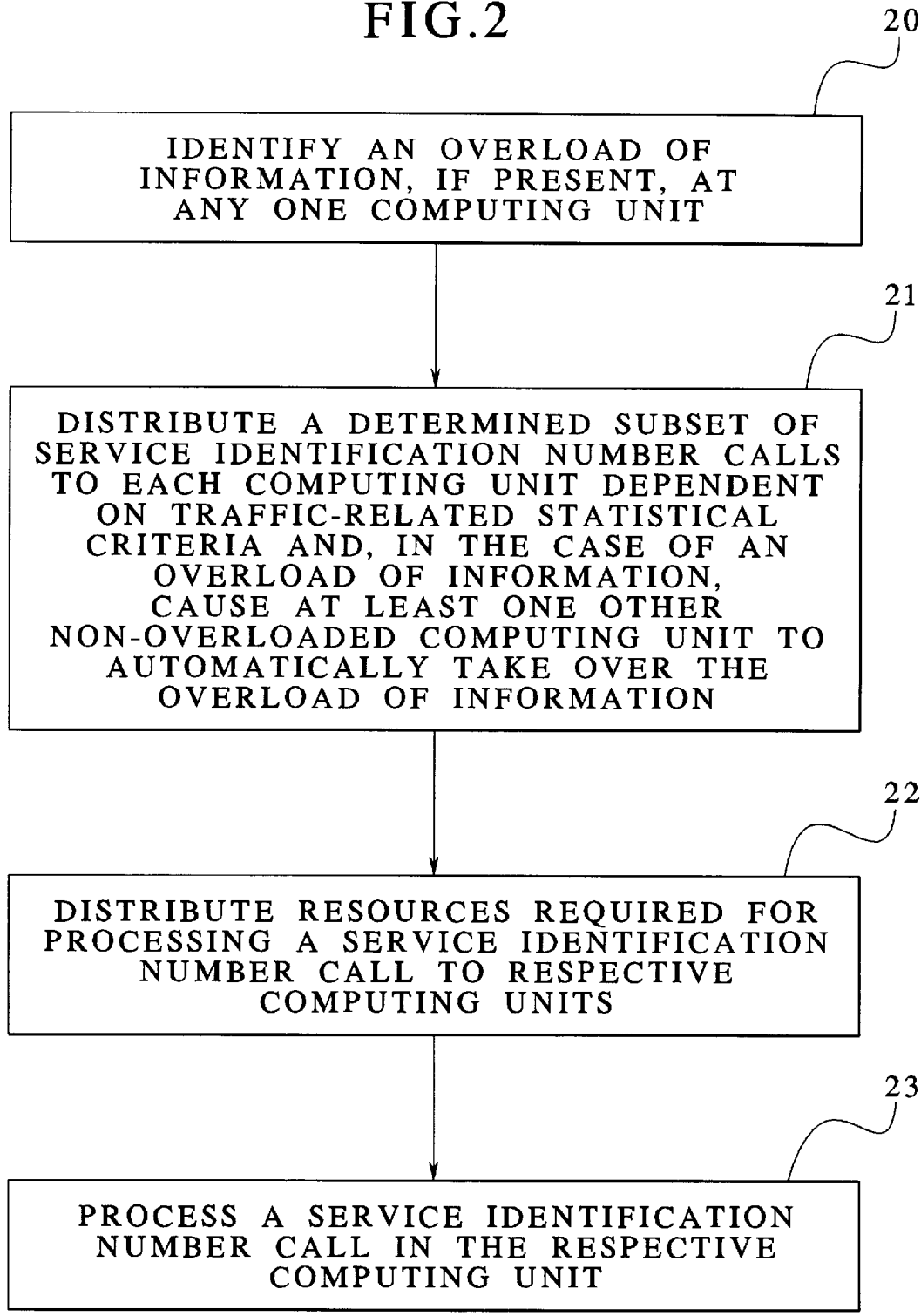

SERVICE CONTROL POINT IN AN INTELLIGENT NETWORK FOR OPTIMIZING CALL THROUGHPUT

BACKGROUND OF THE INVENTION

1. Field of the Invention

The present invention is directed to a service control point in an intelligent network of the type including multiple computing units which process multiple identification number or "IN" calls in parallel.

2. Description of the Prior Art

In larger service control points which include several computing units for the parallel processing of IN calls, there are two major impediments which limit the service control point's achievable throughput (calls per time unit). The first impediment is the service control point's limited access to absolute counters. Absolute counters count events, i.e. calls, in order to effect certain functions such as call limitation or nth call. The second impediment is the service control point's limited access to RAM memories of computing units for storage of the routing data. Routing data is that which specifies the execution of a service at the service control point depending on the IN number.

For many IN services, one or several absolute counters are to be incremented per call. One computing unit is thereby respectively responsible for managing a particular absolute counter. If, however, a call that influences the state of this counter is processed on another computing unit, the order to increment the counter must first be sent to the computing unit responsible for the counter and then a corresponding response must be awaited. This results in a veritable communication bottleneck. It therefore follows that as the number of active computing units increases, the probability that an absolute counter is not present at the computing unit which is processing the call also increases. With the use of Ethernet as a communication medium, such increased communication can also lead to "treshing" (reduction of the achievable throughput at the bus due to an increased collision rate).

The storage of the routing data claims a very large number of storage units. For this reason, even with an expansion of the RAM memory on the order of 200 MB (or more), it is not possible to continually hold all of the routing trees, which contain the aforementioned routing data as well as the references to absolute counters, in a computing unit in the RAM memory.

If, for the reasons cited, the routing data required for a call is not located in the RAM memory, it must be loaded by a common memory for the computing units. Such process typically results in a memory bottleneck which, in turn, leads to time-consuming page faults (storage and retrieval processes of data and programs from the RAM memory). If the rate of page fault occurrence becomes too great, treshing may result which then leads to overly-slow call processing (resulting in high call error rates).

BRIEF SUMMARY OF THE INVENTION

The present invention is based on the problem of specifying a service control point in an intelligent network which substantially eliminates the type of communication bottlenecks traditionally known in this field of art which limit the service control point's achievable throughput. To this end, in an embodiment of the present invention, a computing unit in the RAM memory requires only those resources (absolute counter and routing trees) for which there is the possibility, based on the allocated area, that they must be accessed in the course of processing a call. As such, it becomes highly probable that it no longer will be necessary to carry out a separate communication with another computing unit, in the context of processing a call, concerning the incrementing of an absolute counter or initializing a loading process by the secondary memory with regard to the required routing tree.

Moreover, the incorporation of a separate standby computing unit, which only upon failure of a computing unit takes over the load of the failed unit and which normally processes no useful load, will no longer be necessary in accordance with the preferred embodiment of the present invention.

Additional features and advantages of the present invention are described in, and will be apparent from, the detailed description of the invention and the views of the drawing.

BRIEF DESCRIPTION OF THE VIEWS OF THE DRAWING

FIG. 2 shows the method of the present invention for precessing service identification numbers in parallel.

DETAILED DESCRIPTION OF THE INVENTION

Figure 1:
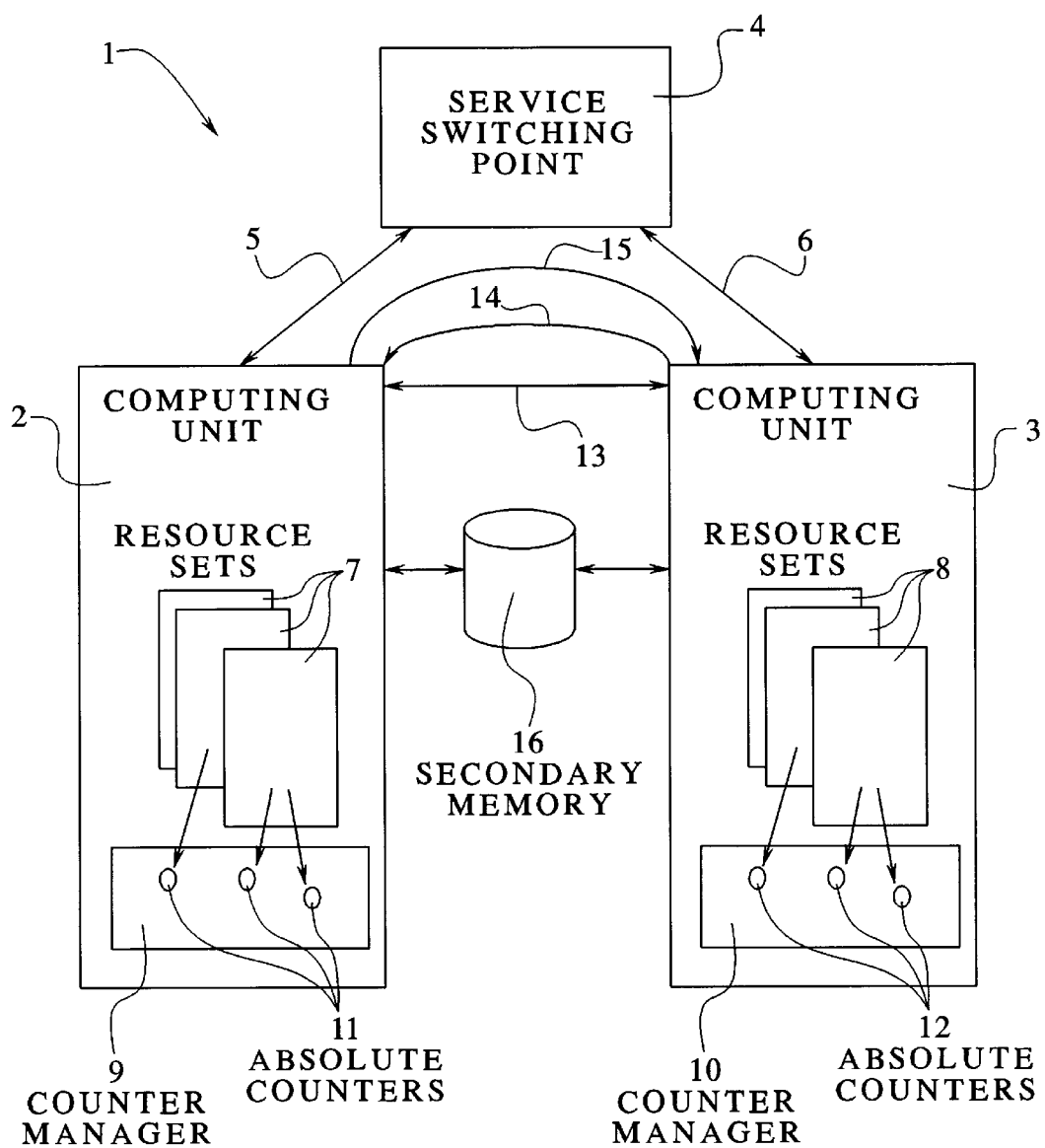
FIG. 1 shows an embodiment of the service control point having two computing units and being in communication with a service switching point, constructed and operating in accordance with the principles of the present invention.

FIG. 1 shows a preferred embodiment of a service control point 1 which includes, for example, two computing units 2 and 3. A determined subset of service identification numbers or "IN" numbers is allocated to each of computing units 2 and 3. Access of a call to the service control point 1 ensues via a service switching point 4 and associated communication signaling system 5, 6.

The resources which are required in the context of processing a call or a service identification number from this subset are correspondingly distributed to one or the other of existing computing units 2 or 3 (specifically, to the RAM memories thereof). For the identification or addressing of such resources, there are resource sets 7, 8 for each service or service identification number which contain corresponding references to the resources to be used for a call into this service or service identification number. The absolute counters 11, 12 of respective computing units 2, 3 are managed by counter managers 9, 10, respectively.

The named allocation or distribution of service identification numbers can be dynamically carried out according to "traffic-related" statistical criteria; i.e. upon the permanent overload of either computing unit 2 or 3. Calls which come into a different computing unit than the one which is responsible for its processing are subsequently forwarded to the proper computing unit. The communication which is necessary to effect this transfer is carried out via a corresponding communication medium LAN 13.

If an equal distribution of the load by means of the aforementioned dynamic distribution is no longer possible (e.g. if a single service identification number alone produces the overload), incoming calls may be taken over by one or several other computing units which are present. During such procedure, a short-term drop in performance may be experienced since the computing unit which takes over a call from an overloaded computing unit must first retrieve the necessary resources information required for the proper processing thereof either from a secondary memory 16, or from the overloaded computing unit, by means of an associated communications processing medium 14,15.

The method of the present invention will now be described more specifically in connection with the flow chart shown in FIG. 2. Pursuant to the basic embodiment of the method of the present invention, it is described at step 21 to distribute a determined subset of service identification number calls to each computing unit. The resources which are then required for processing a service identification number call from this subset are correspondingly distributed to the respective computing units at step 22. Thereafter, the service identification number calls are processed in their respective computing units as shown at step 23.

As already described, the distribution of service identification number calls can be dynamically carried out according to traffic-related statistical criteria (see step 21). Indeed, the method of the present invention initially contemplates the possibility of such an overload and identifies an overload of information, if present, at any one computing unit as indicated at step 20. Accordingly, in the case of an overload of information, the step 21 of distributing service identification number calls causes at least one other non-overloaded computing unit to automatically take over the overload of information. Pursuant to such procedure, the computing unit which takes over a call from an overloaded computing unit retrieves the necessary resources information which is required for the proper processing thereof from the overloaded computing unit via an associated communication processing medium. Thereafter, such service identification number calls are properly processed in their respective computing units at step 23.

It should be understood that various changes and modifications to the presently preferred embodiment described herein will be apparent to those skilled in the art. Such changes in modifications may be made without departing from the spirit and scope of the present invention and without diminishing its attendant advantages. It is, therefore, intended that such changes and modifications be covered by the hereinafter appended claims.

What is claimed is:

1. A service control point in an intelligent network comprising a plurality of computing units which process service identification number calls in parallel, means for respectively distributing a determined subset of said service identification number calls to one of said computing units for processing in said one of said computing units; and means for respectively distributing resources required for processing a service identification number call from the determined subset in said one of said computing units.

2. The service control point according to claim 1, wherein said means for distributing a determined subset of said service identification number calls comprises means for allocating said determined subset to one of said computing units dependent on a load distribution component according to statistical criteria.

3. The service control point according to claim 2, further comprising means for identifying an overload of information at any one of said computing units, and for causing at least one other computing unit, which is not in an overloaded state, to automatically take over said overload of information.

4. A method of processing service identification numbers in parallel at a service control point in an intelligent network wherein the service control point includes a plurality of computing units, the method comprising the steps of respectively distributing a determined subset of said service identification number calls to one of said computing units, respectively distributing resources required for processing a service identification number call from the determined subset in said one of said computing units, and processing the service identification number call from said subset in said one of said computing units.

5. The method of processing service identification numbers according to claim 4, wherein said step of distributing a determined subset of said service identification number calls further comprises specifically distributing said determined subset to one of said computing units dependent on traffic-related statistical criteria.

6. The method of processing service identification numbers according to claim 5, further comprising the step of identifying an overload of information at any one of said computing units, and wherein said step of distributing a determined subset of said service identification number calls further comprises causing at least one other computing unit, which is not in an overloaded state, to automatically take over said overload of information.

* * * * *